US012577023B2

(12) United States Patent　　　　　(10) Patent No.: US 12,577,023 B2

Grefenstein et al.　　　　　　　　　　(45) Date of Patent: Mar. 17, 2026

(54) RECYCLABLE PAPER PACKAGING WITH HIGH BARRIER TO WATER VAPOR AND OXYGEN

(71) Applicant: Constantia Pirk GmbH & Co. KG, Pirk (DE)

(72) Inventors: Achim Grefenstein, Altrip (DE); Dudley Jones, Bristol (GB); Stefan Büttner, Neumarkt i. d. Oberpf. (DE)

(73) Assignee: Constantia Pirk GmbH & Co. KG, Pirk (DE)

( * ) Notice: Subject to any disclaimer, the term of this patent is extended or adjusted under 35 U.S.C. 154(b) by 509 days.

(21) Appl. No.: 17/904,591

(22) PCT Filed: Nov. 27, 2020

(86) PCT No.: PCT/EP2020/083727

§ 371 (c)(1),
(2) Date: Aug. 18, 2022

(87) PCT Pub. No.: WO2021/164913

PCT Pub. Date: Aug. 26, 2021

(65) Prior Publication Data

US 2023/0114239 A1　　　Apr. 13, 2023

(30) Foreign Application Priority Data

Feb. 18, 2020　(AT) ............................... A 50116/2020

(51) Int. Cl.
B32B 9/00　　　　　(2006.01)
B32B 7/12　　　　　(2006.01)
(Continued)

(52) U.S. Cl.
CPC ............... B65D 65/40 (2013.01); B32B 7/12 (2013.01); B32B 27/08 (2013.01); B32B 27/10 (2013.01);
(Continued)

(58) Field of Classification Search
CPC ....... Y10T 428/30; B65D 65/40; B32B 27/08; B32B 27/10; B32B 27/306; B32B 7/12;
(Continued)

(56) References Cited

U.S. PATENT DOCUMENTS

| | | |
|---|---|---|
| 4,561,920 A | 12/1985 | Foster |
| 5,506,036 A | 4/1996 | Bergerioux |
(Continued)

FOREIGN PATENT DOCUMENTS

| | | |
|---|---|---|
| CN | 1205670 A | 1/1999 |
| CN | 101508369 A | 8/2009 |
(Continued)

OTHER PUBLICATIONS

Chinese Search Report Jul. 18, 2024 for Chinese Application No. 202080096724.4.
(Continued)

*Primary Examiner* — Daniel H Miller
(74) *Attorney, Agent, or Firm* — Husch Blackwell LLP

(57) ABSTRACT

A recycling-friendly, easily producible paper packaging laminate with a high barrier against water vapor, oxygen and/or aromas, wherein a barrier film includes at least one substrate layer, a joining layer, and a barrier layer, wherein the joining layer is arranged between the substrate layer and the barrier layer, in that the substrate layer consists predominantly of polyethylene or polypropylene with a polyethylene content or a polypropylene content of at least 60 wt. % of the substrate layer, in that at least the at least one substrate layer of the barrier film is stretched, in that the content of the paper layer is between 50 wt. % and 90 wt. % of the paper packaging laminate, and in that the barrier film is joined to the paper layer by a hydrophilic adhesive layer, wherein the side of the paper layer facing the barrier film is uncoated.

17 Claims, 1 Drawing Sheet

(51) Int. Cl.

| | | |
|---|---|---|
| *B32B 27/08* | (2006.01) |
| *B32B 27/10* | (2006.01) |
| *B32B 27/30* | (2006.01) |
| *B32B 27/32* | (2006.01) |
| *B32B 27/34* | (2006.01) |
| *B65D 65/40* | (2006.01) |

(52) U.S. Cl.
CPC ............ *B32B 27/306* (2013.01); *B32B 27/32* (2013.01); *B32B 27/34* (2013.01); *B32B 2255/10* (2013.01); *B32B 2255/20* (2013.01); *B32B 2255/205* (2013.01); *B32B 2307/514* (2013.01); *B32B 2307/718* (2013.01); *B32B 2307/728* (2013.01); *B32B 2553/00* (2013.01)

(58) Field of Classification Search
CPC ............ B32B 2255/10; B32B 2255/20; B32B 2255/205
USPC ....................................................... 428/408
See application file for complete search history.

(56) References Cited

U.S. PATENT DOCUMENTS

| | | | |
|---|---|---|---|
| 5,529,834 | A | 6/1996 | Tsai et al. |
| 5,591,520 | A | 1/1997 | Migliorini et al. |
| 9,359,119 | B2 | 6/2016 | Kaisig et al. |
| 2018/0149988 | A1 | 5/2018 | Kawaguchi et al. |
| 2018/0304607 | A1 | 10/2018 | Öhman et al. |
| 2018/0319559 | A1 | 11/2018 | Toft et al. |
| 2018/0354690 | A1 | 12/2018 | Collaud et al. |
| 2019/0176455 | A1 | 6/2019 | Kikuchi et al. |
| 2019/0389184 | A1 | 12/2019 | Heinze |
| 2020/0122439 | A1 | 4/2020 | Grefenstrin et al. |

FOREIGN PATENT DOCUMENTS

| | | | | |
|---|---|---|---|---|
| CN | 103158316 | A | | 6/2013 |
| CN | 104395423 | A | | 3/2015 |
| CN | 105073421 | A | | 11/2015 |
| CN | 105459501 | A | | 4/2016 |
| CN | 108290384 | A | * | 7/2018 |
| CN | 110582399 | A | | 12/2019 |
| DE | 102013213478 | A1 | | 1/2015 |
| DE | 102017201449 | A1 | | 8/2018 |
| EP | 0530662 | A1 | | 3/1993 |
| EP | 1342567 | A1 | | 9/2003 |
| EP | 2821351 | A1 | | 1/2015 |
| EP | 3 409 470 | A1 | | 12/2018 |
| EP | 3594406 | A1 | | 1/2020 |
| EP | 3194164 | B1 | | 4/2020 |
| JP | 10218170 | A | | 8/1998 |
| JP | 2000-128144 | A | | 5/2000 |
| JP | 2000-185729 | A | | 7/2000 |
| JP | 2000-203556 | A | | 7/2000 |
| JP | 2005096779 | A | | 4/2005 |
| JP | 2012086857 | A | | 5/2012 |
| JP | 2017056997 | A | | 3/2017 |
| RU | 2589439 | C2 | | 7/2016 |
| WO | 97/16312 | A1 | | 5/1997 |
| WO | 03002343 | A1 | | 1/2003 |
| WO | 03093009 | A1 | | 11/2003 |
| WO | 2006027662 | A1 | | 3/2006 |
| WO | 2008037764 | A1 | | 4/2008 |
| WO | 2009017588 | A1 | | 2/2009 |
| WO | 2009112255 | A1 | | 9/2009 |
| WO | 2009112256 | A1 | | 9/2009 |
| WO | 2011/003564 | A1 | | 1/2011 |
| WO | 2012123085 | A1 | | 9/2012 |
| WO | 2013032932 | A1 | | 3/2013 |
| WO | 2013041469 | A1 | | 3/2013 |
| WO | 2013086950 | A1 | | 6/2013 |
| WO | 2015151027 | A1 | | 10/2015 |
| WO | 2017005597 | A1 | | 1/2017 |
| WO | 2017/102704 | A1 | | 6/2017 |
| WO | 2017089506 | A1 | | 6/2017 |
| WO | 2018034350 | A1 | | 2/2018 |
| WO | 2018102704 | A1 | | 6/2018 |
| WO | 2018107177 | A1 | | 6/2018 |
| WO | 2018202479 | A1 | | 11/2018 |
| WO | 2019/012075 | A1 | | 1/2019 |
| WO | 2019239334 | A1 | | 12/2019 |

OTHER PUBLICATIONS

Machine translation of RU2589439.
Machine translation of CN103158316A.
Russia Search Report dated Nov. 27, 2020 for Russian Application No. 2022124509/05(053002).
Machine Translation of JP2012-086857A.
Machine Translation of WO2018/034350A.
Machine Translation of JP2017-056997A.
Machine Translation of Japaneses Office Action dated Jan. 12, 2024 for Japanese Patent Application No. 2022-549123.
Yam, Kit; The Wiley Encyclopedia of Packaging Technology, 3rd Edition; John Wiley & Sons, New York, 1986; 1366 Pages.
Habenicht, Gerd, et al.; "Bonding: Basics, Technologies, Applications (VDI Book), 5th Edition"; Auflage, Springer, Berlin, Heidelberg; 2006; 1100 Pages.
Confederation of European Paper Industries (CEPI); "The New EN 643—European List of Standard Grades of Paper and Board for Recycling"; Revised 2013; 28 Pages.
Carton Council of Canada; "Carton Recycling Primer", Mar. 2015; 13 Pages.
Uehara, Gabriel Abreu, et al.; "Recycling assessment of multilayer flexible packaging films using design of experiments"; Polfmeros; 2015 ; 11 Pages.
Sari, P. S., et al.; "Recycling of Polyolefin Materials"; Springer Series on Polymer and Composite Material; Springer, 2016.
Morris, Barry, A.; "The Science and Technology of Flexible Packaging—Multilayer Films from Resin and Process to End Use"; A vol. in Plastics Design Library, Books—Elsevier Science and Technology; 2017; 710 Pages.
Kaiser, Katharina, et al.; "Recycling of Polymer-Based Multilayer Packaging: A Review"; MDPI Journals, Recycling, vol. 3, Issue 1; 2018; 26 Pages.
Labelpack; "Market study: Plastic films in Europe"; https://www.labelpack.de/41298-2/; Mar. 8, 2018; 2 Pages.
Alpla; "Alpla Moving Into HDPE Recycling";' Nov. 4, 2019; 4 Pages.
Recycling Magazin; "New recycled polyolefins from Borealis"; Oct. 18, 2019; 2 Pages.
Waste and Resources Action Programme (WRAP); Confederation of Paper Industries, "Paper and Card Packaging—Design Tips for Recycling"; Nov. 3, 2019; 15 Pages.
Austrian Office Action; Application No. A50116/2020; Issued: Sep. 29, 2020; 2 Pages.
Austrian Opposition; Application No. A50116/2020; Issued: Jul. 14, 2020; 31 Pages.
Austrian Submission of Apponent; Application No. A50116/2020; Issued: Jan. 28, 2022; 102 Pages.
International Preliminary Report on Patentability; Application No. PCT/EP2020/083727; Issued: Jul. 30, 2021; 12 Pages.
International Search Report and Written Opinion of the International Searching Authority; Application No. PCT/EP2020/083727; Completed: Jan. 29, 2021; Mailing Date: Feb. 8, 2021; 11 Pages.
Russia Search Report dated Jul. 31, 2023 for Russian Application No. 2022124509/05(053002).
"Life Cycle Assessment of fresh dairy packaging at Elopak", Master Thesis, Vegard Ruttenborg, Norwegian University of Science and Technology (NTNU), submitted Feb. 2017, published by May 15, 2017.
"Production and Packaging of Non-Carbonated Fruit Juices and Fruit Beverages", Second Edition, Edited by P.R. Ashurst, Blackie Academic & Professional, an imprint of Chapman & Hall, 1995.
"Food Packaging" Edited by Takashi Kadoya, Academic Press, 1990.

(56) References Cited

OTHER PUBLICATIONS

Bakker, "The Wiley Encyclopedia of Packaging Technology", 1986, Seiten 497-501.

Morris, "The Science and Technology of Flexible Packaging", 2017, Seiten 106-108.

Paper for Recycling Quality Control Guidelines—Confederation of European Paper Industries—retrieved from: https://www.cepi.org/paper-for-recycling-quality-control-guidelines/ ; Dec. 2, 2016.

Has aluminium multilayer packaging passed its sell-by-date?—Melanie Williams Consulting—retrieved from: https://melaniewilliamsconsulting.com/news/sell_by-date/ ; Jan. 28, 2020.

Collection of data sheets for Stora Enso liquid packaging boards dated 2008-2012.

Redacted data sheet for 320 mN CLC/C Duplex paperboard from Frovi dated Dec. 1, 2010.

\* cited by examiner

RECYCLABLE PAPER PACKAGING WITH HIGH BARRIER TO WATER VAPOR AND OXYGEN

TECHNICAL FIELD

The present teaching relates to a recyclable paper packaging laminate consisting of a paper layer having a paper with a grammage of 30 to 360 g/m² and a barrier film joined thereto, which, in addition to being recyclable, also has a high oxygen, water vapor and/or aroma barrier.

BACKGROUND

In the packaging industry, paper packaging laminates are used which are intended to have different properties depending on their application. Such paper packaging laminates are usually laminated with multilayer plastics films produced by means of an extrusion process, coextrusion process (in both cases in a flat film process as well as in a blown film process) or lamination process (joining of individual layers by means of a laminating adhesive), or combinations thereof. Layers not consisting of plastics can also be integrated in the paper packaging laminate, for example, a layer of aluminum or further papers. The paper packaging laminate usually also has an outer sealing layer in order to process the paper packaging laminate by means of heat sealing such that a desired form of packaging, e.g., a pouch, a bag, etc., is formed.

A typical requirement for a paper packaging laminate is a barrier function against water vapor, oxygen, and aroma. For this purpose, the paper packaging laminate usually contains a barrier layer consisting of aluminum or a suitable barrier polymer, such as ethylene vinyl alcohol copolymer (EVOH) or polyamide (PA).

A paper packaging laminate usually also contains a sealing layer in order to be able to process the paper packaging laminate into a packaging by heat sealing. A sealing layer is typically made of a polyolefin, usually polypropylene (PP) or polyethylene (PE) with the different densities LLDPE, LDPE, MDPE, or HDPE (also designed as a blend or multilayered with the same or different types).

In addition, further layers can also be contained therein to give the paper packaging laminate the desired properties, such as toughness, rigidity, tear strength, etc.

In order to process the paper packaging laminate in a simple manner, the paper packaging laminate should naturally also not become warped or curled during processing, and therefore symmetric layer structures are usually used for the laminated plastics films.

It is also known to change the properties of the paper packaging laminate by means of uniaxial or biaxial orientation of plastics layers of the paper packaging laminate. Such an orientation can be achieved by the extrusion process, for example, in a multiple bubble process, or only after the extrusion process by elongating (stretching) the plastics film in the machine direction (in the longitudinal direction of the paper packaging laminate) and/or in the transverse direction (normal to the longitudinal direction). In particular, the orientation of the plastics film can improve rigidity, tensile strength, and toughness.

However, it must be noted here that, with blown film extrusion and flat film extrusion, the extrusion gap (1.5 to 2.5 mm for blown film) or the gap of the extrusion die is significantly larger than the end thickness of the extruded film (typically between 10 and 200 μm). For this purpose, the extruded melt is elongated at temperatures well above the melting point of the extruded polymer, giving it its final thickness. In blown film extrusion, for example, the melt is typically elongated in the transverse direction approximately by a factor of 2 to 3 (the so-called blow-up ratio) and in the longitudinal direction by a factor of 1:10 to 1:100 (the so-called draw-down ratio). However, this elongation during extrusion cannot be compared to stretching a plastics film, since stretching is usually carried out at temperatures just below (typically 5° C. to 20° C. below) the melting point of the polymer in order to permanently align the disordered polymers and the partially crystalline regions by stretching in the stretching direction. In so-called MDO stretching (only in the machine direction), a stretching gap (distance between the rollers) of 40-100 mm is usually used. In the case of biaxial stretching, stretching in the transverse direction subsequently takes place in a heated oven.

For ecological reasons in particular, paper should often be used as packaging material because paper is easily recyclable. Due to the usual requirements placed on the packaging material, such as barrier functions against water vapor, oxygen and/or aroma, or sealability for producing packaging, paper alone cannot be used as packaging material because paper alone does not have any significant barrier properties. In the field of flexible packaging, paper is therefore mostly combined with other layers, such as layers of plastics or metal, in order to meet the barrier requirements. However, such paper packaging laminates, for example, a frequently used paper/aluminum/polyethylene structure, are usually difficult or impossible to recycle due to the materials used.

Recently, more and more paper packaging has come onto the market, which is equipped with only thin barrier and sealing layers, so that in paper recycling the foreign components/impurities that are tolerable according to EN 643.1 do not exceed the maximum 5% of the total weight of the packaging specified therein; see, for example, "Design Tips for Recycling" by CPI, Confederation of Paper Industry, www.wrap.org.uk/packaging. However, it must also be noted that some coating materials, such as silicone and wax, and also some printing inks are also considered to be critical for the recycling process even at quantities of less than 5%.

WO 2013/086950 A1 discloses recyclable laminates with water-dispersible ionomers (WPI) as adhesives, with which a thermoplastic is joined to a base material made of paper or aluminum. The laminate is recyclable because the paper layer and the thermoplastic can be separated by the WPI, but the recycling step requires high water temperatures of preferably 80° C. and exposure times of preferably 1 hour.

EP 3194164 B1 describes laminate structures for food with paper as material layer, aluminum as gas barrier layer and polymer layers as laminating material. In this case, special attention is paid to better environmental compatibility by omitting the ozone treatment in the case of surface modification of the polymers.

SUMMARY

A problem addressed by the present teaching is that of providing a recycling-friendly paper packaging laminate made from paper with a high barrier against water vapor, oxygen and/or aromas, which is easily producible and recyclable.

This problem is solved in that the barrier film comprises at least one substrate layer, a joining layer, and a barrier layer, wherein the joining layer is arranged between the substrate layer and the barrier layer, in that the substrate layer consists predominantly of polyethylene or polypropylene with a polyethylene content or a polypropylene content of at least 60 wt. % of the substrate layer 4, preferably at least 70 wt. % and very particularly preferably at least 80 wt. %, in that at least the at least one substrate layer of the barrier film is stretched, in that the content of the paper layer is between 50 wt. % and 90 wt. %, preferably between 70 wt. % and 90 wt. %, of the paper packaging laminate, and in that the barrier film is joined to the paper layer by a hydrophilic adhesive layer, wherein the side of the paper layer facing the barrier film is uncoated. In this way, the (high) barrier and recycling functions are achieved with 10 to 50 wt. %, preferably 10 to 30 wt. %, polyolefin content (PE or PP), i.e., significantly more than was previously considered necessary, and with a predominant paper content in the paper packaging laminate. As a result, a recyclable paper packaging can be produced that still has a high barrier effect against water vapor, oxygen and/or aroma.

The barrier film can be designed asymmetrically with a substrate layer which is joined to the barrier layer via the joining layer. Asymmetric barrier films can be designed to be thinner, which means that the polymer content in the paper packaging laminate can be reduced. In this case, the barrier layer is preferably arranged to face the paper layer and joined to the paper layer via the adhesive layer.

Alternatively, the barrier film is designed symmetrically with a barrier layer which is joined on both sides to a substrate layer via a joining layer, wherein one of the substrate layers is joined to the paper layer via the adhesive layer. Symmetric barrier films are easier to process because a symmetric film exhibits less curling. The barrier layer is also well protected in a symmetric structure.

The barrier layer can be designed as a barrier coating in the form of a metallization or a coating with silicon oxide or aluminum oxide or as a layer made of a barrier polymer, preferably a polyamide or an ethylene vinyl alcohol copolymer. In addition, the layer made of the barrier polymer can also be provided with a barrier coating in the form of a metallization or a coating with silicon oxide or aluminum oxide in order to further increase the barrier effect. This makes it possible to adjust the barrier effect very well to the respective barrier requirements of a paper packaging laminate.

The barrier film is preferably stretched. This can be achieved, for example, by coextruding and subsequently stretching the barrier film as a whole. In addition, stretching a barrier polymer can also increase its barrier effect.

Many packaging applications require a sealing layer that can be joined to the barrier film on the side facing away from the paper layer. In order to increase the recyclability of the paper packaging laminate, it is advantageous if the sealing layer consists of PE when the substrate layer consists predominantly of PE, or if the sealing layer consists of PP when the substrate layer consists predominantly of PP. This allows paper packaging laminates to be produced with a particularly pure polymer content, which is beneficial for recyclability.

Advantageously, the sealing layer is also stretched. In this way, the thickness of the sealing layer can be reduced. In addition, the sealing layer can also be coextruded and stretched with the barrier film, which simplifies production.

BRIEF DESCRIPTION OF THE DRAWINGS

In the following, the present teaching shall be described in greater detail with reference to FIGS. 1 to 3 which, by way of example, show schematic and non-limiting advantageous embodiments of the present teaching, in which.

DETAILED DESCRIPTION

Figure 1:
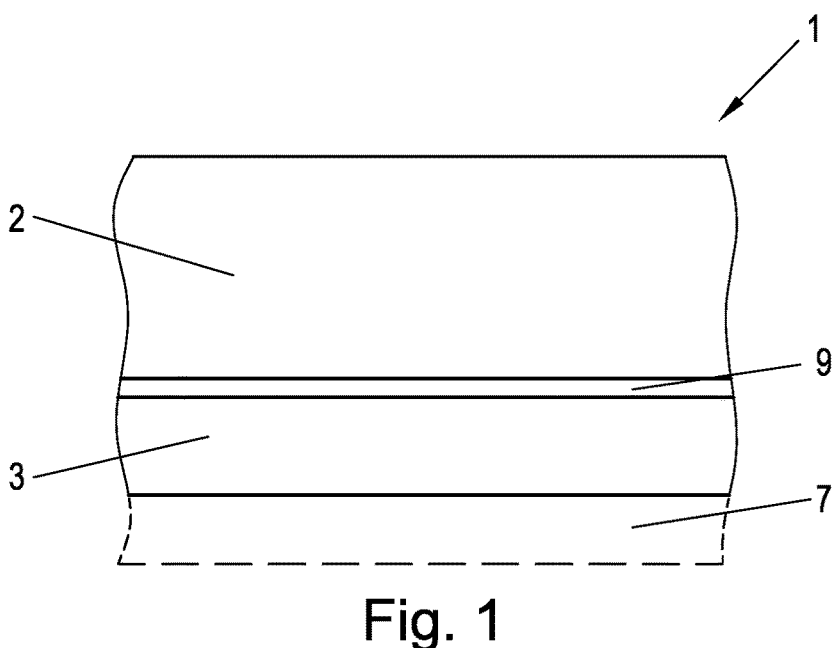
FIG. 1 shows a first embodiment of a paper packaging laminate according to the present teaching.

FIG. 1 shows a paper packaging laminate 1 according to the present teaching with a paper layer 2 and a barrier film 3 joined thereto, which realizes the required barrier effect against water vapor, oxygen and/or aroma. A sealing layer 7 can be provided on the side of the paper packaging laminate 1 facing away from the paper layer 2. The paper layer 2 is joined to the barrier film 3 with an adhesive layer 9 made of a hydrophilic laminating adhesive. Typical thicknesses of the paper packaging laminate 1 are 50 μm to 150 μm.

In the following, the individual layers of the paper packaging laminate 1 are explained in more detail.

The paper layer 2 consists of paper with a grammage of 30 to 360 g/m², preferably 30 to 100 g/m² in the case of flexible packaging. Paper is known to be made from fibrous materials, for example, cellulose, mechanical pulp, or waste paper. Within the scope of this application, glassine is also understood to be paper.

The paper layer is uncoated on at least one side (the side facing the barrier film 3 in the paper packaging laminate 1). "Uncoated" means that the paper is essentially untreated on this side, in particular that no plastics material is applied to the paper, which can penetrate the paper, penetrate the paper fibers and be joined to the paper fibers. Such a plastics coating would be an application inseparably joined to the paper layer on this side. Specifically, this side is neither coated with a barrier lacquer, sealing lacquer or other lacquer, nor is it extrusion-coated with a plastics layer. However, the layers of phyllosilicates or minerals (clay coating) frequently applied in the paper industry can definitely be present, since these usually do not interfere with paper recycling.

The laminating adhesive used in the paper packaging laminate 1 for the adhesive layer 9 is hydrophilic. A hydrophilic laminating adhesive interacts strongly with water and is usually (but not necessarily) water-soluble as well. A hydrophilic laminating adhesive used in the paper packaging laminate 1 according to the present teaching loses its adhesion when exposed to water, either due to chemical mechanisms, such as the breaking of hydrogen bridging bonds, or because the laminating adhesive dissolves in water.

The hydrophilic laminating adhesive can be produced on the basis of starch, sugar derivatives, cellulose, amino resin, (poly)acrylate, polyvinyl alcohol (PVOH), polyvinyl acetate, polyacrylic acid, maleic acid-modified ethylene copolymers, methyl cellulose, carboxymethyl cellulose, carboxy-functional polyester, polyethylene succinate, polybutylene succinate, ionomers, or hydrophilic polyurethane.

Also usable are hydrophilic laminating adhesives for extrusion laminating, for example, but not limited to, an ethylene copolymer with comonomers containing polar groups, such as ethylene vinyl acetate copolymer (EVA), ethylene butyl acrylate (EBA), ethylene acrylic acid copolymer (EAA), or a polyethylene/polypropylene grafted with maleic anhydride (PE-G-Mah, PP-G-Mah).

The laminating adhesive is naturally selected such that a sufficient adhesion between the paper layer 2 and the barrier film 3 is provided to prevent undesirable delamination of the paper packaging laminate 1 when in use. The adhesive layer 9 should preferably achieve a bond strength between the paper layer 2 and the barrier film 3 of at least 1 N/15 mm, preferably at least 1.5 N/15 mm.

The bond strength is determined with a peel test. In a peel test, a test strip of the paper packaging laminate 1 is pulled apart at free ends of the paper layer 2 and the barrier film 3. The free ends are clamped in a pulling machine and pulled apart at a predetermined pulling-off angle (e.g., 90°) and the force is thus measured. If the width of the test strip is 15 mm, the bond strength is given as x N/15 mm. In this case, the indication of the bond strength is the near-constant peel value and not the maximum tear value that is produced at the beginning of the peel test as a force peak. Typically, a number of peel tests are carried out in order to determine the bond strength and the bond strength sought is determined as an average value from the individual measurements. The peel test is carried out, for example, according to the ASTM F904 standard.

Due to the use of paper in the paper packaging laminate 1, a liquid laminating adhesive can be used to produce the adhesive layer 9 between the paper layer 2 and the barrier film 3, in particular a laminating adhesive dissolved in water or a suitable solvent. After the liquid laminating adhesive has been applied and after the paper layer 2 and barrier layer 3 have been joined, the laminating adhesive is dried, wherein the water or the solvent is able to diffuse through the paper. After drying, the adhesive layer 9 remains, producing a connection between the paper layer 2 and the barrier film 3. However, non-liquid laminating adhesives can also be used to produce the adhesive layer 9, as long as they are hydrophilic.

Extrusion lamination is also conceivable, in which the melted lamination adhesive is extruded onto the paper layer 2 or the barrier film 3, or onto both, at high temperatures of above 180° C. and the paper layer 2 and barrier film 3 are subsequently joined. After the laminating adhesive has solidified, it forms the adhesive layer 9.

Figure 2:
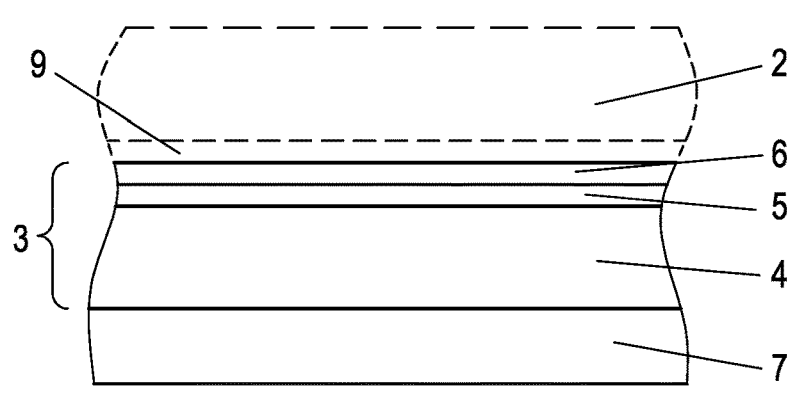
FIG. 2 shows an embodiment of an asymmetric barrier film.

The barrier film 3 consists of at least one stretched substrate layer 4 made predominantly of polyethylene (PE) or predominantly of polypropylene (PP), a joining layer 5, and a barrier layer 6 (FIG. 2). The thickness of the barrier film 3 is typically 10-40 μm.

Figure 3:
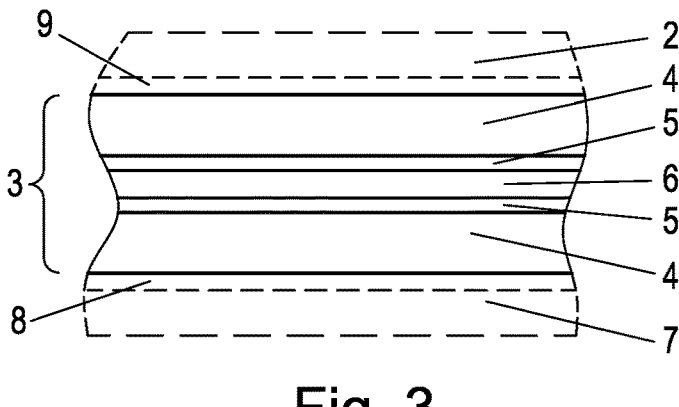
FIG. 3 shows an embodiment of a symmetric barrier film.

The barrier film 3 can be designed asymmetrically (as in FIG. 2) with a substrate layer 4, a barrier layer 6, and a joining layer 5 arranged in between, wherein the joining layer 5 is joined directly to the substrate layer 4 and the barrier layer 6. In the case of an asymmetric barrier film 3, the barrier layer 6 in the paper packaging laminate 1 is preferably arranged facing the paper layer 2 and is joined directly to the uncoated side of the paper layer 2 by the adhesive layer 9, but can also face the sealing layer 7. However, the barrier film 3 can also be designed symmetrically (as in FIG. 3). In this case, the barrier layer 6 would be joined on both sides via a respective joining layer 5 to a respective substrate layer 4 (which can also be different). In a symmetric design, the uncoated side of the paper layer 2 is joined directly to a substrate layer 4 of the barrier film 3 via the adhesive layer 9.

In one possible embodiment, the barrier layer 6 is a barrier coating applied to the joining layer 5 in the form of a metallization, for example, with aluminum, or a coating of silicon oxide (SiOx) or aluminum oxide (AlOx). This embodiment is preferably used with an asymmetric barrier film 3. Due to the barrier coating, a barrier layer 6 with a thickness of only a few nanometers (typically about 10 to 50 nm) is formed on the joining layer 5. The metallization can be carried out, for example, by a known vacuum metallization. The SiOx or AlOx coating can be applied, for example, using a chemical vapor deposition process or by evaporation in a vacuum. Of course, other methods for producing the barrier coating are also possible. The barrier coating can additionally also be coated with a protective varnish to protect against microcracking which can impair the barrier function. With such a barrier coating, a low oxygen permeation (oxygen transmission rate, OTR) of less than 2 cm$^3$/m$^2$/d (at 23° C., 75% relative humidity on both sides) and a low water vapor permeation (water vapor transmission rate, WVTR) of less than 3 cm$^3$/m$^2$/d (at 38° C., 90% relative humidity on both sides) can be achieved, wherein d stands for day, i.e., 24 hours.

In a further possible embodiment, the barrier layer 6 is a layer made of a barrier polymer (used both in asymmetric and in symmetric barrier films 3), i.e., a polymer with a sufficient barrier property, in particular against oxygen and/or aroma. The barrier polymer is preferably a polyamide (PA) or an ethylene vinyl alcohol copolymer (EVOH). EVOH is preferred as the barrier polymer. The barrier polymer has a maximum thickness of 20%, preferably 5 to 10%, of the total thickness of the barrier film 3, for example, no more than 2 to 8 μm at a barrier film thickness of 10-40 μm. With a barrier polymer as the barrier layer 6, it is possible to not only achieve a low water vapor permeation (similar to or better than above) but also a low oxygen permeation (oxygen transmission rate, OTR) of less than 2 cm$^3$/m$^2$/d (at 23° C., 75% relative humidity on both sides) and a high aroma barrier. There is no objective measure for the aroma barrier, so that the effect as an aroma barrier is determined subjectively by odor tests.

If a barrier layer 6 made of a barrier polymer is provided in the barrier film 3, the barrier layer 6 in an asymmetric or symmetric barrier film 3 can additionally be coated with a barrier coating, in particular metallized, for example, with aluminum, or with an aluminum oxide or a silicon oxide coating. The barrier effect of the barrier film 3 can thus be increased even further, in particular the OTR and WVTR can be significantly reduced even further, namely to less than 1 cm$^3$/m$^2$/d each. In this embodiment, the barrier coating could also be additionally coated with a protective varnish.

The substrate layer 4 is predominantly made of a polyethylene (PE) or polypropylene (PP), each with a polyethylene content or a polypropylene content of at least 60 wt. % of the substrate layer 4, preferably at least 70 wt. %, and very particularly preferably at least 80 wt. %. The higher the polyethylene content or the polypropylene content (i.e., the purer the substrate layer 4 becomes), the better the recyclability. The thickness of a substrate layer 4 is preferably 5 to 35 μm, wherein it is also possible for substrate layers 4 of different thicknesses and/or different structures to be used in a symmetric barrier film 3. However, in a symmetric structure, both substrate layers 4 are preferably made of the same main component, PE, or PP. Conventional additives (such as slip additives, antiblock additives, fillers, etc.) can be added to the substrate layer 4. Different types of polyethylene or types of polypropylene can also be used in the substrate layer 4, in each case as a mixture or coextrudate. In addition to the respective main component PE or PP, the substrate layer 4 can also comprise a respectively compatible polyolefin material.

Types of polyethylene to be taken into consideration in the substrate layer 4 are, for example, HDPE (high-density polyethylene with a density between 0.94-0.97 g/cm$^3$), MDPE (medium-density polyethylene), LDPE (low-density polyethylene with a density between 0.915-0.935 g/cm$^3$), LLDPE (linear low-density polyethylene with a density between 0.87-0.94 g/cm$^3$), or mLLDPE (linear metallocene low-density polyethylene). The use of HDPE or MDPE is preferred. Types of polypropylene to be taken into consideration in the substrate layer 4 are, for example, an atactic, syndiotactic, or isotactic PP.

In principle, any type of polyethylene is suitable as a polyolefin material compatible with PE, in particular also ethylene copolymers, such as ethylene vinyl acetate copolymer (EVA), ethyl methacrylate (EMA), ethylene/acrylic acid copolymer (EAA), or ethylene butyl acrylate copolymer (EBA). Polypropylene (PP) or a cyclic olefin copolymer (COC) in an amount of no more than 20 wt. % can also be used as a polyolefin material compatible with PE. In the case of PP, a polypropylene random copolymer with ethylene as comonomer (usually 5 to 15%), a polypropylene copolymer with ethylene or a polypropylene homopolymer that is sufficiently compatible with linear types of PE, such as mLLDPE, LLDPE or HDPE, is preferably used in order to achieve at least limited recyclability.

PP copolymers, such as random copolymers and block copolymers, can be taken into consideration as the polyolefin material compatible with PP. An addition of up to 20% polyethylene also hardly affects recyclability.

If the substrate layer 4 contains polyolefin materials compatible with PE or PP, then the content of the main component polyethylene (PE) or polypropylene (PP) in the substrate layer 4 is preferably at least 60 wt. % (based on the substrate layer 4), preferably at least 70 wt. %, and very preferably at least 80 wt. % in order to improve recyclability. The PE or the PP and the compatible polyolefin material can be present in the substrate layer 4 as a mixture.

However, the substrate layer 4 can also have a multilayer structure (extruded or coextruded) comprising one (or also more) PE or PP layer(s) and one (or also more) layer(s) of the compatible polyolefin material.

A cavitating agent can also be added to the main component PE or PP of the substrate layer 4, wherein the cavitating agent is added in an amount of 5-30 wt. %, preferably 15-25 wt. %, of the substrate layer 4. A polymer incompatible with PE or PP (i.e., a polymer that remains isolated in the PE or PP matrix), for example, polyamides (PA), polyesters (e.g., PET or PBT), polylactides (PLA), can be taken into consideration as cavitating agents. A mineral cavitating agent, such as calcium carbonate or mica, can also be used. The cavitating agent is usually present in the form of a fine powder which, before extrusion, is embedded as a masterbatch in a PE or PP matrix and mixed with the PE or PP granulate.

If a cavitated PE or PP layer is used in the substrate layer 4, it is preferably surrounded on one or both sides by a non-cavitated PE or PP layer. A conceivable structure of the substrate layer 4 of the laminate layer 3 would be, for example, a cavitated PE layer that is joined on one side to a non-cavitated PE layer (e.g., coextruded), wherein the cavitated PE layer in the paper packaging laminate 1 would face the paper layer 2. Another preferred structure of the substrate layer 4 would be, for example, a cavitated PE layer which is joined on both sides to a non-cavitated PE layer (e.g., coextruded). Such structures can also be achieved with PP as the main component in the substrate layer 4. The use of a cavitated layer in the substrate layer 4 can also improve the sealing properties of the paper packaging laminate 1.

The sum of PE or PP, cavitating agent, any additives, and possible compatible polyolefin materials in the substrate layer 4 can naturally only add up to 100 wt. %. The decisive factor is the content of polyethylene or polypropylene upon which the other proportions must be based.

At least the substrate layer 4 in the barrier film 3 is stretched unidirectionally or bidirectionally, i.e., in the machine direction (MDO) (usually the longitudinal or extrusion direction) and/or in the transverse direction (TDO) (rotated by 90° to the machine direction). If a barrier polymer is used as the barrier layer 6 in the barrier film 3, the entire barrier film 3 is preferably stretched. If the joining layer 5 or the barrier layer 6 is coated, stretching is carried out before coating. The degree of stretching in the machine direction and in the transverse direction need not be the same. The degree of stretching in the machine direction is preferably at least 4:1 to 8:1. The degree of stretching in the transverse direction is preferably at least 5:1 to 10:1. Unidirectional MDO stretching is preferred because unidirectional stretching is easier than bidirectional stretching.

By stretching the barrier film 3 or at least the substrate layer 4 of the barrier film 3, the weight content of the polyolefin (PE or PP) in the paper packaging laminate 1 can be kept low, since a thin but nevertheless stiff film can be produced by stretching.

As is known, the barrier effect can also be significantly increased by stretching a barrier polymer. By stretching the barrier polymer, approximately three to four times higher barrier values are achieved when compared to an unstretched barrier polymer of the same type, and therefore a less expensive barrier polymer can be used with the same barrier effect. As a result, the cost of the paper packaging laminate 1 can also be significantly reduced.

The joining layer 5 is used to join the barrier layer 6 and the substrate layer 4. The purpose is to achieve a sufficient bond strength, in particular, to reliably prevent undesired delamination of the barrier film 3. Suitable polar joining layers 5 preferably consist of polymers of increased polarity, for example, on the basis of polyolefins grafted with maleic anhydride (such as PE or PP), ethylene vinyl acetate copolymer (EVA), ethylene/acrylic acid copolymer (EAA), ethylene butyl acrylate copolymer (EBA), or similar polyolefin copolymers. The material of the joining layer 5 is preferably selected according to the main component of the substrate layer 4. The maximum thickness of the joining layer 5 is 10% of the total thickness of the barrier film 3, for example, 1 to 5 μm at a thickness of the barrier film 3 of 10-40 μm.

The sealing layer 7 is preferably a polyethylene, for example, LLDPE, LDPE, MDPE, or HDPE, if the main component of the substrate layer 4 is a PE. Mixtures of different types of PE in the sealing layer 7 are also conceivable, as is a multi-layer sealing layer 7 made from the same or different types of PE. If the main component of the substrate layer 4 is a polypropylene, the sealing layer 7 is preferably a polypropylene, for example, an unstretched PP (CPP). In this case, the sealing layer 7 can also be a mixture of different PPs and/or have a multi-layer structure. For the purpose of better recyclability, the thickness of the sealing layer 7 should be as small as possible, in particular, less than 50 μm, preferably less than 30 μm.

If required, a joining layer 8 (indicated in FIG. 3), for example, as mentioned above, can also be provided between the barrier film 3 and the sealing layer 7 in order to improve adhesion.

In order to ensure that the paper packaging laminate 1 is easily recyclable, the polymer content of the paper packaging laminate 1 (essentially the barrier film 3 and, if present, the sealing layer 7) should make up between 10 wt. % and 50 wt. % of the paper packaging laminate 1, preferably no more than 30 wt. %, particularly preferably no more than 20 wt. %. The paper packaging laminate 1 according to the present teaching thus follows a different approach than the recommendation in the prior art in which it is required that the polymer content is kept below 5 wt. %. In order to nevertheless achieve good recyclability, the paper layer 2 is uncoated on the side facing the barrier film 3 and joined to the barrier film 3 by a hydrophilic adhesive layer 9.

When recycling the paper packaging laminate 1, it is, usually after mechanical shredding, soaked in water at a specific water temperature and for a specific time (pulp process). Due to the properties of the paper packaging laminate 1 according to the present teaching, during the pulp process of the recycling, the paper layer 2 can detach from the barrier film 3, together with all its layers and potential impurities for the paper recycling. The hydrophilic adhesive layer 9 reacts with the water during the pulp process and loses its adhesive properties or dissolves completely in water, so that the paper layer 2 is separated from the barrier film 3. The paper layer 2 can thus dissolve in the water and form a pulp from which in turn recycled paper can be produced. For the recycling of the paper packaging laminate 1, it is advantageous if the adhesive layer 9 loses its adhesion in a sufficient manner or dissolves at a water temperature of 40° C. within a maximum of 20 minutes, preferably a maximum of 10 minutes, particularly preferably a maximum of 5 minutes, so that the paper layer 2 and the barrier film 3 with the sealing layer 7 easily separate.

Since the metallization (if provided) remains on the detached barrier film 3 after separation during the pulp process in paper recycling, the recycled paper does not turn gray, which would inevitably occur with a barrier metallization of a paper surface.

The barrier film 3 separated from the paper layer 2 in paper recycling, optionally with the sealing layer 7, can be fed to a further recycling process in order to be able to recycle the polyolefin (main component PE or PP) contained therein. By making the barrier film 3 and the sealing layer 7 as pure as possible with the main component PE or PP and compatible materials, the barrier film 3, optionally with the sealing layer 7, can also be easily and inexpensively recycled using common methods in mechanical recycling. Due to the small thickness of the barrier layer 6 in the barrier film 3 (if provided), the recyclability of the polyolefin stream discharged from the paper recycling pulp is not impaired.

Advantageously, the barrier film 3 is produced by coextrusion because this allows for a particularly simple, cost-effective production. Preferably, the known blown film or flat film extrusion process is used. In this case, the individual layers of a symmetric or asymmetric layer structure, as described above (i.e., substrate layer(s) 4 and joining layer(s) 5 and optionally also barrier layer 6 made of barrier polymer), of the barrier film 3, are, with the exception of a possible coating, preferably coextruded in one step. After coextrusion, this laminate is stretched unidirectionally or bidirectionally. After stretching, a barrier coating can also be applied, either as a barrier layer 6 on the joining layer 5 or on the barrier polymer of the barrier layer 6.

The barrier film 3 can also be coextruded with the sealing layer 7 in one step. In this case, the sealing layer 7 is also stretched with the barrier film 3. Alternatively, the sealing layer 7 can be joined to the stretched barrier film 3, either by extrusion lamination (extruding the sealing layer 7 onto the barrier film 3) or in a laminating process (joining the barrier film 3 to the sealing layer 7 with a laminating adhesive). When laminating the sealing layer 7, a stretched sealing layer 7 can also be used.

The sealing layer 7 is particularly preferably integrated during production directly into the barrier film 3 on the side of the barrier film 3 opposite the barrier layer 6, for example, by coextrusion. The sealing layer 7 can thus be designed to be thinner and the total content of polymer in the paper packaging laminate 1 can be lower than in the case of a subsequently applied sealing layer 7. Apart from that, this also simplifies production.

The stretching of the barrier film 3 (optionally with the sealing layer 7) can take place in-line (i.e., immediately after coextrusion) or off-line (i.e., at a later point in time after coextrusion). The stretching in the case of bidirectional stretching can take place first in the machine direction and then in the transverse direction, or it is also conceivable for the stretching to take place in both directions simultaneously. The stretching typically takes place at approximately 10° C. to 30° C., typically at approximately 20° C., below the lowest melting temperature of a plastics in the barrier film 3 or optionally also a sealing layer 7 (for HDPE at approximately 128° C. to 130° C.). In any case, the stretching takes place before a possible coating of the barrier layer 6 and/or the joining layer 5.

In the case of a cavitated PE or PP, the unidirectional or bidirectional stretching in the substrate layer 4 produces microcavities in the PE or PP in a known manner due to the cavitating agent. It was found that the density of the substrate layer 4 could be significantly reduced by the microcavities to values between 0.4-0.85 g/cm³. The barrier film 3 can thus be made lighter which further reduces the polymer content.

The paper layer 2 is laminated with the barrier film 3, optionally with the sealing layer 7. For this purpose, the hydrophilic laminating adhesive can be applied in liquid form either to the paper layer 2 or the barrier film 3, or to both, for example, by means of roller application or printing or by spraying. Subsequently, the paper layer 2 and the barrier film 3 are pressed together, for example, between two rollers, to produce the paper packaging laminate 1. If required, the laminating adhesive can then be dried to form the adhesive layer 9, for example, by guiding it through a heat tunnel.

Alternatively, the paper layer 2 and the stretched barrier film 3 can be joined by an extrusion laminating process when using a suitable laminating adhesive. In extrusion lamination, the melted lamination adhesive is extruded onto the paper layer 2 or the barrier film 3, or both, and then the paper layer 2 and barrier film 3 are pressed together, for example, between two rollers, to produce the paper packaging laminate 1. The laminating adhesive can then cool down, which can be supported usually by cooled rollers.

A sealing layer 7 of the paper packaging laminate 1 could also be laminated after the paper layer 2 and the barrier film 3 have been laminated.

In an exemplary embodiment, a barrier film 3 with a thickness of 10-40 μm is used with a substrate layer 4 with the main component PE (at least 60 wt. % PE content), preferably HDPE, which accounts for at least 60% of the thickness of the stretched barrier film 3. A polar PE or PP material (depending on the main component of the substrate layer 4) is used as the joining layer 5. A barrier layer 6 made of EVOH (barrier polymer) is joined to the joining layer 5. The barrier film 3 is coextruded and then stretched unidirectionally or bidirectionally. In addition, the barrier polymer can be coated with a barrier coating (metallization, SiOx or AlOx) after stretching. In an alternative embodiment, a barrier coating is applied to the stretched substrate layer 4 with the joining layer 5. The at least partially stretched barrier film 3 is joined to a paper layer 2 by an adhesive layer 9 made of a hydrophilic laminating adhesive. In addition, a sealing layer 7 made of a PE material can be provided on the side of the paper packaging laminate 1 facing away from the paper layer.

The invention claimed is:

1. A recyclable paper packaging laminate comprising:
   a paper layer having a paper with a grammage of 30 to 360 g/m²;
   a hydrophilic adhesive layer;
   at least one substrate layer;
   at least one joining layer;
   a barrier layer; and
   a sealing layer facing away from the paper layer;
   wherein the at least one substrate layer, the at least one joining layer, and the barrier layer are positioned on one side of the paper layer and between the paper layer and the sealing layer,
   wherein the at least one substrate layer or the barrier layer is joined to the one side of the paper layer via the hydrophilic adhesive layer,
   wherein the at least one joining layer is arranged between the at least one substrate layer and the barrier layer,
   wherein the at least one substrate layer consists predominantly of polyethylene or polypropylene with a polyethylene content or a polypropylene content of at least 60 wt. % of the at least one substrate layer,
   wherein the at least one substrate layer is stretched,
   wherein the content of the paper layer is between 50 wt. % and 90 wt. % of the paper packaging laminate,
   wherein the side of the paper layer joined to the at least one substrate layer or the barrier layer is uncoated, and
   wherein the sealing layer consists of polyethylene if the at least one substrate layer consists predominantly of polyethylene, or the sealing layer consists of polypropylene if the at least one substrate layer consists predominantly of polypropylene.

2. The recyclable paper packaging laminate according to claim 1,
   wherein the at least one substrate layer is a single substrate layer joined to the barrier layer via a single joining layer.

3. The recyclable paper packaging laminate according to claim 2, wherein the barrier layer is arranged to face the paper layer and is joined to the paper layer via the hydrophilic adhesive layer.

4. The recyclable paper packaging laminate according to claim 1, wherein the barrier layer is joined on a first side to a first substrate layer via a first joining layer and joined on a second side to a second substrate layer via a second joining layer, and one of the first and second substrate layers is joined to the paper layer via the hydrophilic adhesive layer.

5. The recyclable paper packaging laminate according to claim 1, wherein the barrier layer is designed as a barrier coating in the form of a metallization or a coating with silicon oxide or aluminum oxide.

6. The recyclable paper packaging laminate according to claim 1, wherein the barrier layer is designed as a layer made of a barrier polymer.

7. The recyclable paper packaging laminate according to claim 6, wherein the layer made of the barrier polymer is provided with a barrier coating in the form of a metallization or a coating with silicon oxide or aluminum oxide.

8. The recyclable paper packaging laminate according to claim 6, wherein the at least one substrate layer, the at least one joining layer, and the barrier layer are stretched.

9. The recyclable paper packaging laminate according to claim 1, wherein the sealing layer is stretched.

10. The recyclable paper packaging laminate according to claim 1, wherein the at least one substrate layer consists predominantly of polyethylene or polypropylene with a polyethylene content or a polypropylene content of at least 70 wt. % of the at least one substrate layer.

11. The recyclable paper packaging laminate according to claim 1, wherein the at least one substrate layer consists predominantly of polyethylene or polypropylene with a polyethylene content or a polypropylene content of at least 80 wt. % of the at least one substrate layer.

12. The recyclable paper packaging laminate according to claim 1, wherein the content of the paper layer is between 70 wt. % and 90 wt. % of the paper packaging laminate.

13. The recyclable paper packaging laminate according to claim 6, wherein the barrier polymer comprises a polyamide or an ethylene vinyl alcohol copolymer.

14. The recyclable paper packaging laminate according to claim 1, wherein the content of polyethylene or polypropylene is between 10 wt. % to 50 wt. % of the paper packaging laminate.

15. The recyclable paper packaging laminate according to claim 1, wherein the hydrophilic adhesive layer is reactive with water to enable separation of the paper layer and the at least one substrate layer or the barrier layer during recycling.

16. The recyclable paper packaging laminate according to claim 15, wherein the hydrophilic adhesive layer provides a bond strength between the paper layer and the at least one substrate layer or the barrier layer of at least 1 N/15 mm.

17. The recyclable paper packaging laminate according to claim 15, wherein the hydrophilic adhesive layer enables separation of the paper layer and the at least one substrate layer or the barrier layer at a water temperature of 40° C. within a maximum duration of 20 minutes.

* * * * *